United States Patent [19]

von Krusenstierna

[11] 4,015,053
[45] Mar. 29, 1977

[54] RECHARGEABLE ELECTRIC ACCUMULATOR CELL WITH AT LEAST ONE ZINC ELECTRODE

[75] Inventor: Otto von Krusenstierna, Taby, Sweden

[73] Assignee: Aktiebolaget Tudor, Sundyberg, Sweden

[22] Filed: Dec. 1, 1975

[21] Appl. No.: 636,603

Related U.S. Application Data

[63] Continuation-in-part of Ser. No. 422,591, Dec. 6, 1973, Pat. No. 3,923,550, which is a continuation of Ser. No. 186,219, Oct. 4, 1971, abandoned.

[52] U.S. Cl. ............................................. 429/49
[51] Int. Cl.² ...................... H01M 4/29; H01M 4/42
[58] Field of Search .............................. 136/165, 30

[56] References Cited
UNITED STATES PATENTS 2,744,860  5/1956  Rines ................................ 204/45 R
3,560,261  2/1971  Stachurski et al. ................. 136/6 R
3,923,550  12/1975  Krusenstierna ...................... 136/165

*Primary Examiner*—John H. Mack
*Assistant Examiner*—H. A Feeley
*Attorney, Agent, or Firm*—Burns, Doane, Swecker & Mathis

[57] ABSTRACT

An improvement in accumulator batteries having a zinc anode and an oxide cathode (e.g., nickel oxide or silver oxide cathode) is disclosed. The zinc anode and/or separator part between the anode and cathode is vibrated at a frequency and amplitude sufficient to inhibit dendrite growth on the zinc anode. The electrolyte contains excess zinc such that solid zinc oxide is present in the fully charged condition. The separator may be provided with circulation enhancement means. The resulting batteries have long life with a large number of charging and discharging cycles.

4 Claims, 2 Drawing Figures

RECHARGEABLE ELECTRIC ACCUMULATOR CELL WITH AT LEAST ONE ZINC ELECTRODE

This application is a continuation-in-part of my pending application Ser. No. 422,591, now U.S. Pat. No. 3,923,550, filed Dec. 6, 1973, which application in turn was a continuation application of my prior application Ser. No. 186,219, filed Oct. 4, 1971, and now abandoned.

The present invention deals with an electric accumulator cell with at least one cathode, at least one zinc anode, separator or spacer arranged between cathode and anode and an alkaline electrolyte. The anode and/or separator (or spacer) is arranged in such a way that it/they vibrate in the plane of or parallel to the electrode.

Electric accumulator cells having zinc anodes in alkaline electrolyte are known in combination with various kinds of cathodes, for example, nickel oxide or silver oxide. The zinc anode-containing cell has several advantages such as, for example, high half cell potential, a high energy to weight ratio and, in comparison to alternative anode materials, a low price. Certain problems are, however, associated with the use of zinc anodes, particularly regarding the life of the cells and the need for large amounts of electrolyte. These problems stem from the special properties of zinc in an alkaline electrolyte.

The zinc anode is a so-called dissoluble electrode, i.e., during the discharge reaction the zinc forms products soluble in the electrolyte. These products leave the anode. Zinc forms mainly zincate ions which then may react further in the electrolyte. The zincate ions then form zinc oxide which has a much lower solubility in the electrolyte than the zincate ions. The zinc oxide precipitates as a solid. The main reactions during discharge of the zinc electrode and the precipitation of zinc oxide are the following:

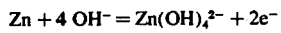

$$Zn + 4 OH^- = Zn(OH)_4^{2-} + 2e^-$$

$$Zn(OH)_4^{2-} = ZnO + H_2O + 2 OH^-$$

Other reactions and other types of ions are present, but the above are dominating and illustrate the main reactions in the cell.

The problems with zinc electrodes are caused by the redeposition of zinc on the electrodes during the charging process, during which the zinc to a large extent forms zinc dendrites which have a tendency to grow towards the counter electrodes and cause a short circuit in the cell. An additional cause of short circuits is the tendency of the zinc to collect at the edges of the electrodes, specially at the lower edge. Thus, there occurs a redistribution of the zinc active material on the electrode during the charging-discharging cycling.

Different methods have been tried to solve these problems. The use of a semipermeable membrane between the zinc electrode and the counter electrode has become very common. The membranes are so dense that the growing of zinc dendrites is made difficult. A large number of additives of different kinds, organic as well as inorganic substances have been tried in the electrolyte, the membranes and the electrode. These endeavours have led to important improvements of cells with zinc electrodes, but the results are still not satisfactory. Attempts have been made to redistribute the active material on the surface of the electrode. On such attempt was to build the cell in such a way that fluid flow and diffusion in the electrolyte were obstructed as much as possible. Thus the redeposition of zinc should take place on the same surface as from which the zinc had been dissolved during discharge. That, however, circumscribes very much the availability of electrolyte with consequences which shall be more closely considered below. Another way to solve the problem of the active material distribution is to pump the electrolyte around in the cells. This presupposes, however, cost increasing and space requiring auxiliary systems including pumps, tubings etc.

The zinc electrode has also shown a tendency for passivation. The mechanism and reasons for such passivation are not fully known, but it is generally thought that one main reason for the passivation is the presence of zinc oxide particles in the active zinc material. These zinc oxide particles isolate portions of the zinc material from participating in the electrochemical process so that the load on the rest of the electrode increases. To avoid the passivation effect as far as possible, great importance has been put upon using such a large amount of electrolyte that the zinc dissolved from the electrodes should be present in a soluble form in the electrolyte. This requires comparatively large amounts of electrolytes in the cell, but even then, deposition of zinc oxide was not fully avoided. Zincate ions are slowly decomposed and form zinc oxide. The mechanism of the reaction is not fully known, but the consequence of this decomposition is that a formation of zinc oxide cannot be totally avoided. It is possible to oversaturate an electrolyte with respect to zincate ions and that has been used in accumulator cells, but the electrolyte volume still remains too large. To take away the zinc oxide which cannot be avoided in the electrolyte, it has also been proposed to pump the electrolyte through a filter on which the zinc oxide is filtered off.

The present invention to rechargeable electric accumulator cells containing at least one zinc anode, at least one cathode, a separator (or spacer) disposed between the zinc anode and cathode, the anode, cathode and separator being arranged in an alkaline electrolyte, in which aforementioned cell, the anode and/or separator between the anode and cathode are arranged to vibrate either in the plane of or parallel to the electrode and is characterized in that the zinc concentration in the electrolyte is so high that the electrolyte contains free solid zinc oxide in the fully charged accumulator cell. Vibration of the zinc anode and/or separator part can be performed in accordance with the teachings as set forth in parent application Ser. No. 422,591 now U.S. Pat. No. 3,923,550, the teachings of which are herein incorporated by reference. As disclosed therein, the zinc anode and/or separator is vibrated in the direction of the plane of the anode or separator at a frequency and amplitude during the charging process sufficient to inhibit dendrite growth on the zinc anode. The vibrating part is mounted so that all portions thereof move substantially the same distance during each cycle of vibration and all portions of the vibrating part move in a reciprocating manner to have at the same moment the same rectilinear movement during all portions of the vibration cycle.

The difficulties involved with maintaining the electrolyte free from zinc oxide have been described above. It is, however, theoretically possible in known cells (and should also be partically possible in fully charged relatively new cells) to keep the electrolyte free from zinc oxide. Such cells are not included in the invention according to which the zinc concentration shall be so high that the presence of solid zinc oxide theoretically or practically cannot be avoided.

The electrolyte preferably consists of potassium hydroxide dissolved in water to a solution containing 20 to 45 percent by weight of the hydroxide. It has been found that it is possible with cells according to the present invention to use electrolytes containing such large quantities of zinc oxide that the electrolyte becomes viscous and slurrylike. Suitably, the electrolyte contains at least 200 grams of zinc oxide, preferably 250 to 400 grams zinc oxide, per liter of electrolyte when the cell is discharged. However, amounts of zinc oxide above 600 grams per liter have been used successfully.

Especially good results were obtained when the vibrating components were constructed so that the electrolyte was pumped between the electrodes. This pumping action ensures that the electrolyte not only is moving back and forth and back but also has a movement which results in an electrolyte circulation between the upper and lower parts of the electrode surfaces.

Figure 1:
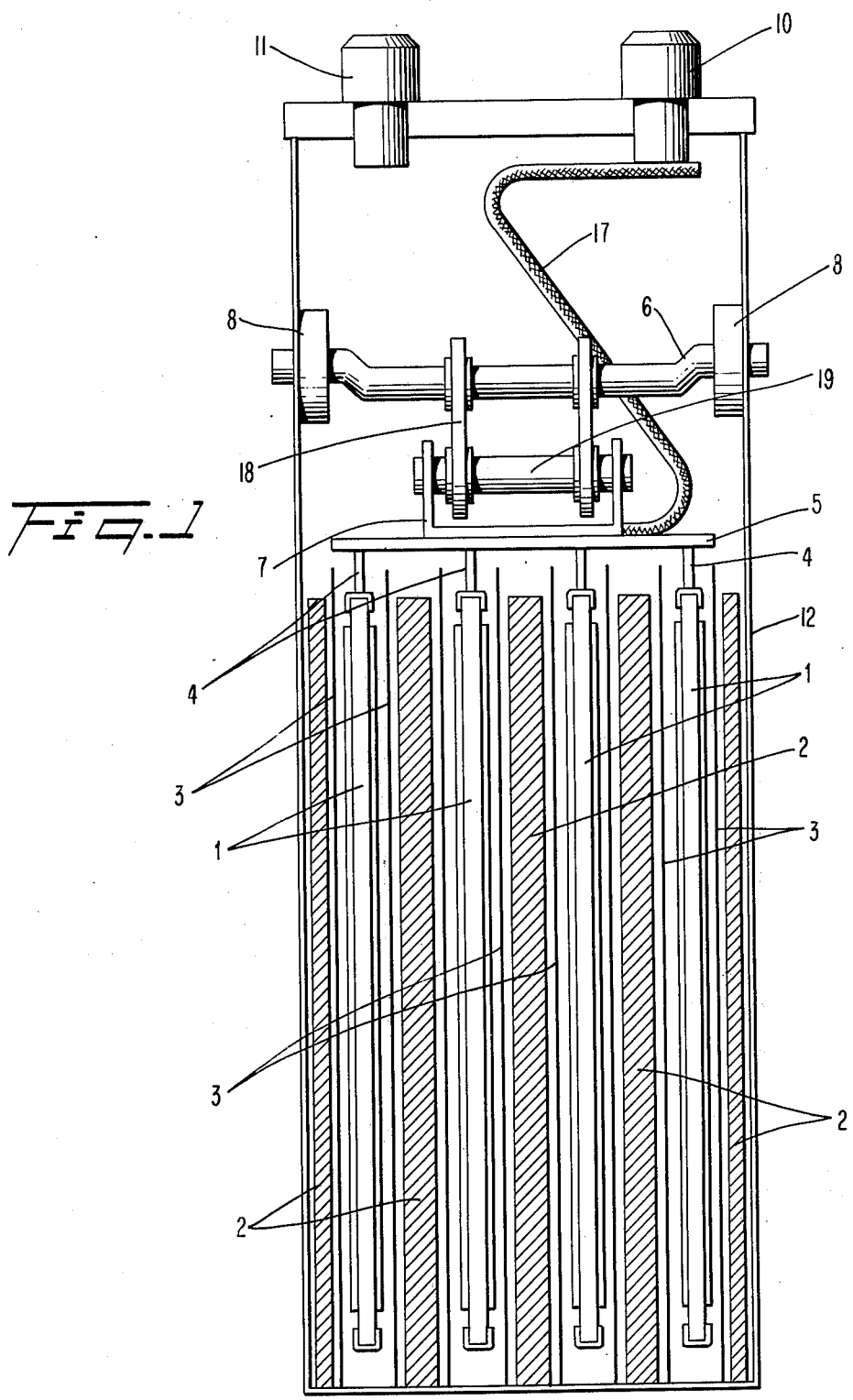
FIG. 1 shows a cell according to the present invention.

In the cell shown in FIG. 1 the anodes are arranged for vibration although it will be understood that the separator may also or alternatively be vibrated.

As shown in FIG. 1, the cell contains a plurality of dissoluble zinc electrodes 1 and counter electrodes 2 between which are disposed separators (or spacers) 3. The dissoluble zinc electrodes 1 are connected by connecting devices 4 to a common bridge 5. The zinc electrode 1 are arranged to be vibrated by means of a shaft 6 journaled between bearings 8 in the cell wall 12. The shaft 6 is eccentrically formed. Circulatory motion may be imparted by shaft 6 by suitable means outside the cell (not shown) and vibratory movement is imparted to the zinc electrodes 1 by yoke 7 and suspension and connecting devices 18 and 19. The shaft 6 is electrically insulated from the electrodes by using connecting devices formed of an insulating material. Through a flexible cord 17, the zinc electrodes may be connected to post 10 on the outside of the cell. The electrodes 2 may similarly be connected to post 11 by conventional means not shown.

Figure 2:
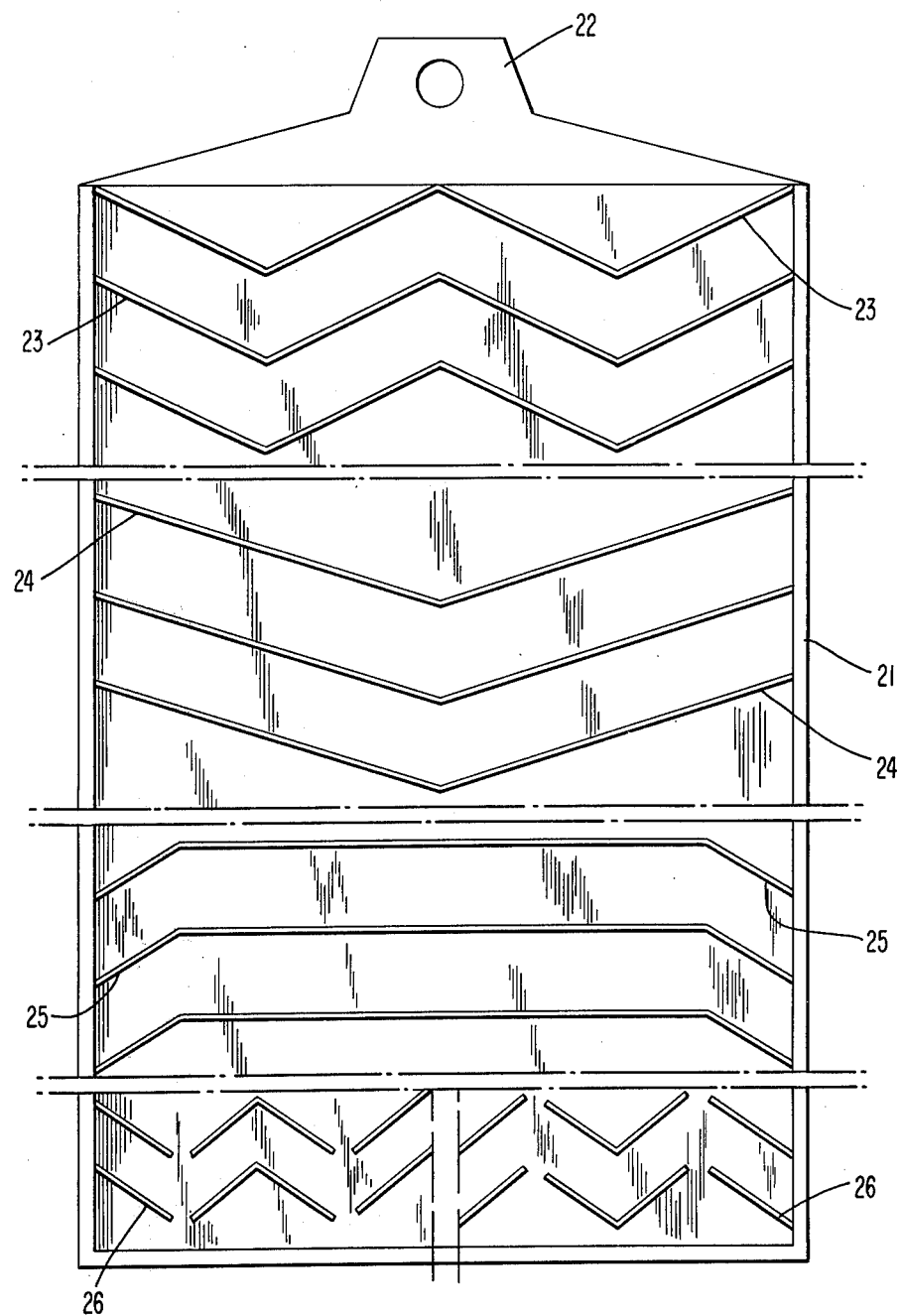
FIG. 2 shows different possible constructions of a separator (or spacer) which is intended to vibrate between the electrodes of the cell.

The separator shown in FIG. 2 is provided with an outer edge 21, and attachment 22 and distance ribs 23, 24, 25 and 26. These ribs are suitably but not necessarily formed likewise on the entire separator and may have, for example, one of the four different configurations shown in the Figure. These ribs 23, 24, 25 or 26 impart a circulation to the electrolyte in an up or down direction as well as a back and forth movement and thus enchance the circulation or pumping of the electrolyte.

The vibration frequency imparted to the zinc anode and/or separator is suitably 1 – 500 Hz and the amplitude is chosen in accordance herewith, in such a way that the linear velocity reaches about 20 cm/second or more, at least at some instance during the up and down movement. The amplitude may thus be on the order of from about 0.1 to 10 mm or more. Preferably, the amplitude is about 4 mm and the frequency about 50 Hz.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A rechargeable electric accumulator cell comprising at least one cathode, at least one zinc anode part and a separator part disposed between each said cathode and zinc anode part arranged in a liquid alkaline electrolyte, vibratory means operatively connected with at least one said part to subject said part to a vibratory movement in the direction of the plane of the part, wherein the said electrolyte contains zinc in an amount of from about 250 to 60 grams of zinc per liter of electrolyte when the cell is discharged, which amount is in excess of that soluble in the electrolyte whereby solid zinc oxide is contained in the electrolyte of the fully charged cell.

2. The rechargeable electric accumulator cell of claim 1 wherein the separator part is provided with pumping enhancement means on the surface thereof.

3. The rechargeable electric accumulator cell of claim 2 wherein said pumping enhancement means are distance ribs.

4. The rechargeable electric accumulator cell of claim 3 wherein said distance ribs are arranged in a chevron pattern.

* * * * *

UNITED STATES PATENT OFFICE
CERTIFICATE OF CORRECTION

Patent No. 4,015,053          Dated March 29, 1977

Inventor(s) Otto von Krusenstierna

It is certified that error appears in the above-identified patent and that said Letters Patent are hereby corrected as shown below:

Column 4, line 38, delete "60" and insert therefore --600--.

Signed and Sealed this

Twenty-first Day of June 1977

[SEAL]

Attest:

RUTH C. MASON
*Attesting Officer*

C. MARSHALL DANN
*Commissioner of Patents and Trademarks*